(12) United States Patent
Seyama et al.

(10) Patent No.: US 10,137,519 B2
(45) Date of Patent: Nov. 27, 2018

(54) FLUX RESERVOIR APPARATUS

(71) Applicant: Shinkawa Ltd., Tokyo (JP)

(72) Inventors: Kohei Seyama, Tokyo (JP); Shoji Wada, Tokyo (JP)

(73) Assignee: SHINKAWA LTD., Tokyo (JP)

( * ) Notice: Subject to any disclaimer, the term of this patent is extended or adjusted under 35 U.S.C. 154(b) by 0 days.

(21) Appl. No.: 15/591,674

(22) Filed: May 10, 2017

(65) Prior Publication Data

US 2017/0297131 A1    Oct. 19, 2017

Related U.S. Application Data

(63) Continuation of application No. PCT/JP2015/074104, filed on Aug. 26, 2015.

(30) Foreign Application Priority Data

Nov. 11, 2014    (JP) .................. 2014-229026

(51) Int. Cl.
  *B23K 3/00* (2006.01)
  *B23K 3/08* (2006.01)
  *B23K 101/42* (2006.01)

(52) U.S. Cl.
  CPC .......... *B23K 3/082* (2013.01); *B23K 2201/42* (2013.01)

(58) Field of Classification Search
  CPC ..... B23K 1/203; B23K 3/0638; B23K 3/0653
  See application file for complete search history.

(56) References Cited

U.S. PATENT DOCUMENTS 5,176,312 A    1/1993  Lowenthal
2005/0133573 A1*  6/2005  Bayot .................. B23K 3/0623
                                        228/207

FOREIGN PATENT DOCUMENTS

| JP | 2001-345543 A |   | 12/2001 |
| JP | 2007-216266 A |   | 8/2007 |
| JP | 2009-113104 A |   | 5/2009 |
| JP | 2012199326 A | * | 10/2012 |
| JP | 2015-177038 A |   | 10/2015 |

OTHER PUBLICATIONS

JP-2012199326-A computer english translation (Year: 2012).*
International Search Report dated Dec. 1, 2015, from corresponding International Application No. PCT/JP2015/074104.

* cited by examiner

*Primary Examiner* — Erin B Saad
(74) *Attorney, Agent, or Firm* — Katten Muchin Rosenman LLP (57) ABSTRACT

A flux reservoir apparatus (100, 200) includes a stage (12) having a recessed portion (13) for reserving flux (51, 52, 53) therein and a flux pot (20) composed of an annular member having a through hole (30) through which the flux (51, 52, 53) flows, the flux pot arranged to move back and forth on the surface (14) of the stage (12) to feed the flux (51, 52, 53) into the recessed portion (13) and to smooth the surface of the flux (51, 52, 53), in which the through hole (30) is an elongated hexagonal hole with a length greater than the width of the recessed portion (13) in the direction perpendicular to the back-and-forth direction, and in which the bottom surface of a flux pot main body (21) is a chevron surface. This reduces leakage of the flux (51, 52, 53) in the flux reservoir apparatus (100, 200).

2 Claims, 9 Drawing Sheets

FLUX RESERVOIR APPARATUS

TECHNICAL FIELD

The present invention relates to structures of flux reservoir apparatuses and, in particular, to a structure of a flux reservoir apparatus for use in a flux transfer device for transferring flux to a protruding electrode of an electronic component.

BACKGROUND ART

In recent years, flip-chip bonding techniques have been increasingly used in which after forming a protruding electrode (e.g. solder bump) on, for example, a semiconductor electronic component, the electronic component is picked up and turned upside down to place the protruding electrode on an electrode pad of a printed circuit board and heat it to high temperature so that the solder of the protruding electrode is melted and the electronic component is bonded to the printed circuit board. In such flip-chip bonding techniques, approaches for improvement in the bonding between the solder and the electrode pad are employed, in which flux (oxide film remover or surface active agent) is transferred to the surface of the protruding electrode (solder bump) and thereafter the protruding electrode is placed on the electrode pad.

In a flux reservoir apparatus used to reserve flux to be transferred onto a protruding electrode of an electronic component, flux is fed onto a rotary disk and reserved on the surface thereof and the surface of the reserved flux is smoothed using a squeegee to form a thin layer of flux, in which the protruding electrode of the electronic component is immersed so that the flux is transferred to the tip end of the protruding electrode (see Patent document 1, for example). Patent document 1 proposes providing a guide plate in an end portion of the squeegee, with which flux left over after the surface of the reserved flux is smoothed using the squeegee is guided onto a recovery tray so that the leftover flux cannot contaminate the other members.

CITATION LIST

Patent Document

Patent document 1: JP2001-345543A

SUMMARY OF INVENTION

Technical Problem

Figure 9A:
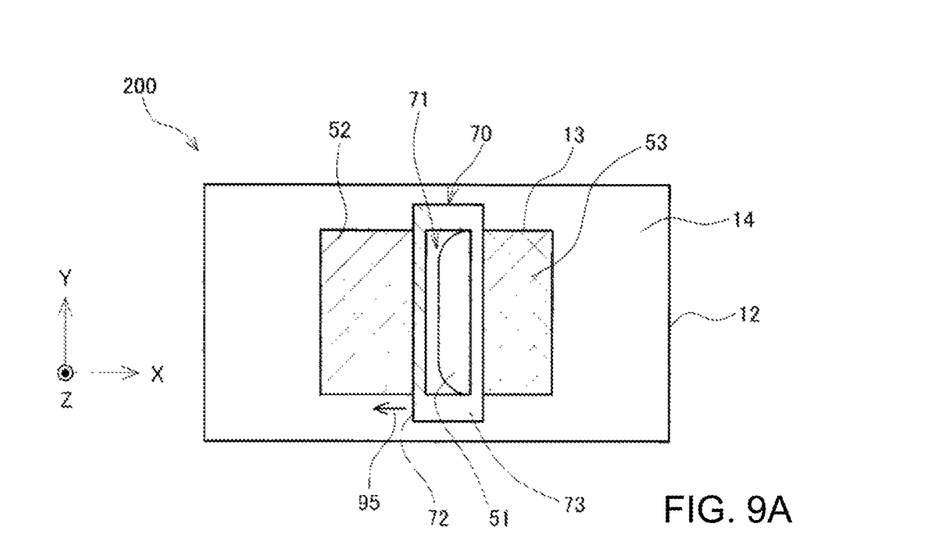
FIG. 9A shows a plan view and FIG. 9B shows an elevational view (side view) of a related art flux reservoir apparatus.
Figure 9B:
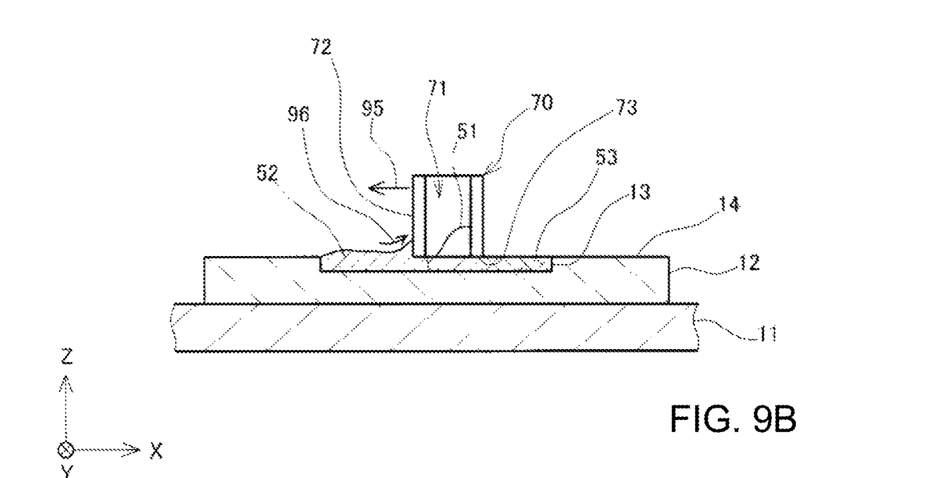

Incidentally, in addition to such a device for reserving flux to be transferred onto a protruding electrode of an electronic component of the type in which flux is reserved on a rotary disk and smoothed thereon using a squeegee as described in Patent document 1, another type is also used, such as a flux reservoir apparatus 200 as shown in FIGS. 9(a) and 9(b), in which a flux pot 70 having a through hole 71 through which flux 51 flows is moved back and forth along the surface 14 of a stage 12 having a recessed portion 13 for reserving flux 52, 53, such that the flux 51 is fed through the stage-side opening of the through hole 71 into the recessed portion 13 of the stage 12 and the surface of the flux 53 reserved in the recessed portion 13 is smoothed with the bottom surface 73 of the flux pot 70. The flux reservoir apparatus 200 of this type suffers from a problem that depending on the type of the flux 51, the flux pot 70 may cause flux 52 raised from the stage surface to outflow and leak out little by little.

It is hence an object of the present invention to reduce leakage of flux in a flux reservoir apparatus.

Solution to Problem

A flux reservoir apparatus according to the present invention includes a stage having a recessed portion for reserving flux therein and a flux pot composed of an annular member having a through hole through which the flux flows, the flux pot arranged to move back and forth on the surface of the stage to feed the flux in the through hole into the recessed portion and to smooth the surface of the flux with the bottom surface of the flux pot, in which the through hole of the flux pot is an elongated hexagonal hole elongated in the direction perpendicular to the back-and-forth direction with a length greater than the width of the recessed portion of the stage in the direction perpendicular to the back-and-forth direction, and in which the bottom surface of the flux pot is a chevron surface in which two surfaces are connected at an angle into a linear ridge.

The flux reservoir apparatus according to the present invention further includes a back-and-forth drive mechanism arranged to rotatably support the flux pot below the surface of the stage and to apply a force in the back-and-forth direction to the flux pot below the surface of the stage.

Advantageous Effect of the Invention

The present invention exhibits an effect that the leakage of flux can be reduced in the flux reservoir apparatus.

BRIEF DESCRIPTION OF THE DRAWINGS

FIG. 5A shows a plan view, FIG. 5B shows an elevational view (side view) and FIG. 5C shows an exploded partial view showing the forward movement of the flux pot of the flux reservoir apparatus according to the embodiment of the present invention.

FIG. 7A shows a plan view.

DESCRIPTION OF EMBODIMENTS

A flux reservoir apparatus 100 according to an embodiment of the present invention will hereinafter be described with reference to the accompanying drawings. The flux reservoir apparatus 100 of this embodiment is arranged to reserve flux to be transferred to a protruding electrode of an electronic component and to be incorporated and used in a flux transfer device.

Figure 1:
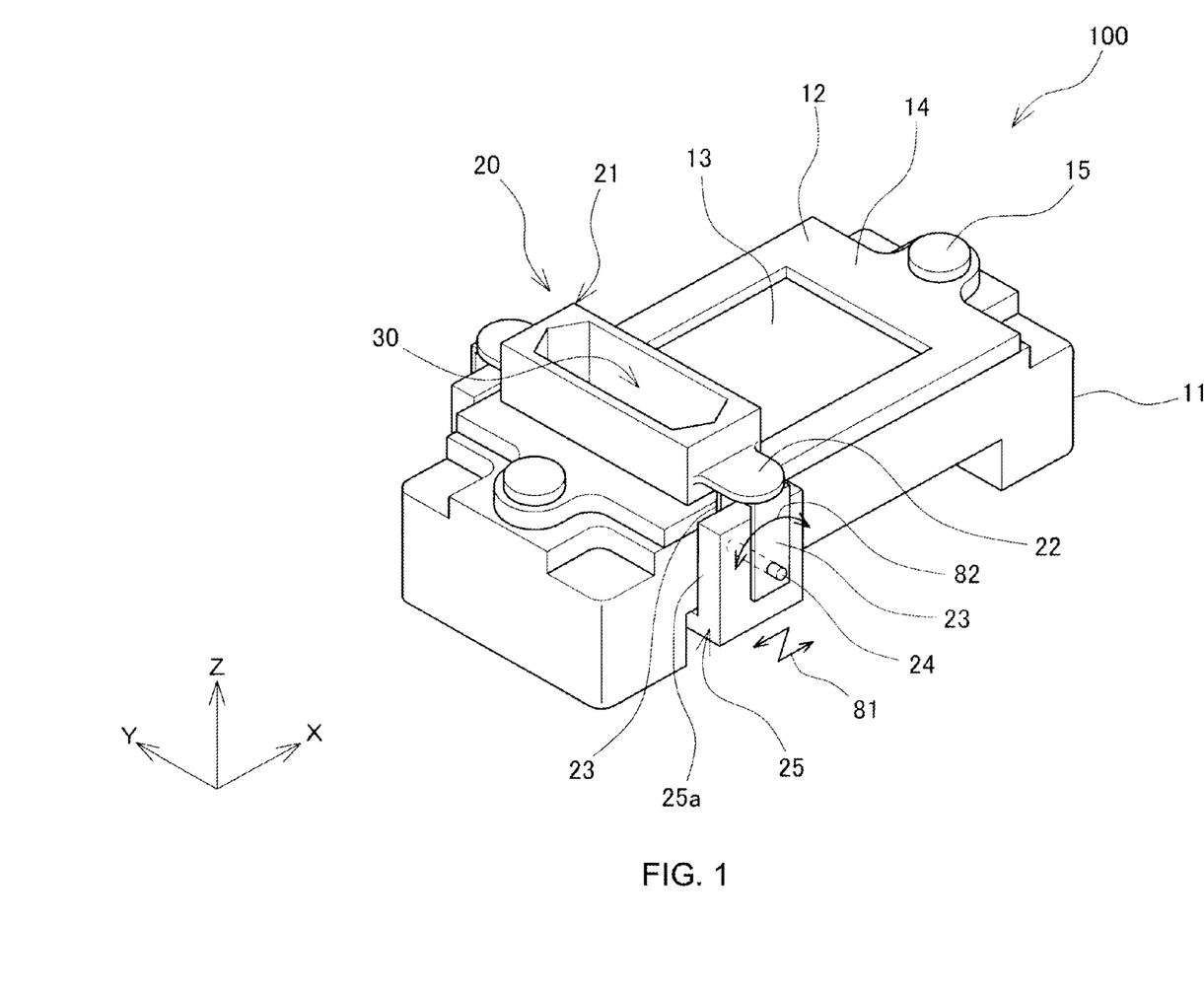
FIG. 1 is a perspective view of a flux reservoir apparatus according to an embodiment of the present invention.

As shown in FIG. 1, the flux reservoir apparatus 100 of this embodiment includes a base 11, a stage 12 attached to the upper surface of the base 11 using a bolt 15, a flux pot main body 21 arranged on the surface 14 of the stage 12, brackets 23 extending below the stage 12 from ribs 22 on either side of the flux pot main body 21, a slider 25 with two arms 25a extending from the ends thereof upward along the side surfaces of the base 11 and the stage 12, and pins 24 that connect the brackets 23 rotatably to the slider 25 below the surface 14 of the stage 12.

The slider 25 is arranged to be moved back-and-forth in the direction indicated by the arrow 81 in FIG. 1 by a motor (not shown) arranged below the base 11 to move the pins 24 and the brackets 23 connected to the slider 25 and the flux pot main body 21 to which the brackets 23 are fixed back-and-forth in the direction of the arrow 81. The flux pot main body 21, the ribs 22, and the brackets 23 form a flux pot 20, while the pins 24, the slider 25, and the motor form a back-and-forth drive mechanism. It is noted that in the following description, the direction of back-and-forth movement (the direction indicated by the arrow 81 in FIG. 1) is X direction, the direction perpendicular to the direction of back-and-forth movement is Y direction, and the vertical direction is Z direction.

Figure 2A:
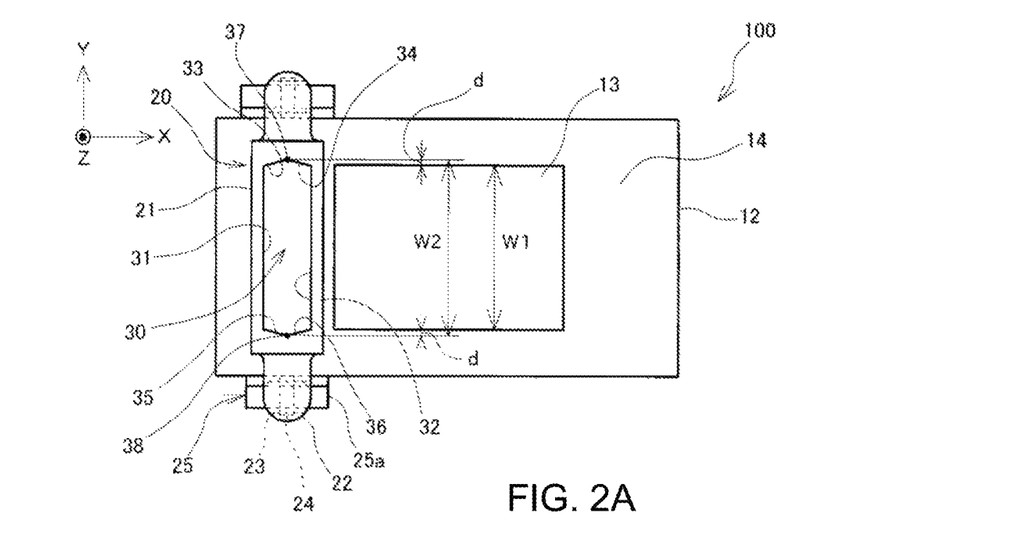
FIG. 2A shows a plan view and FIG. 2B shows an elevational view (side view) of the flux reservoir apparatus according to the embodiment of the present invention.
Figure 2B:
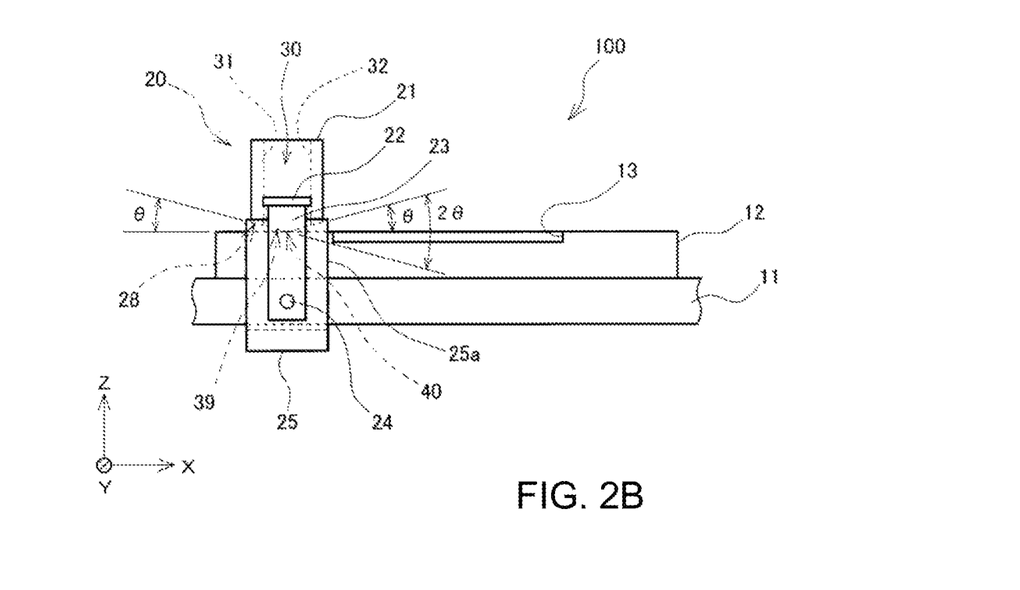

The stage 12 has a recessed portion 13 recessed from the surface 14 to reserve flux therein. As shown in FIG. 2, the recessed portion 13 extends in the direction of back-and-forth movement (X direction) with a width W1. The recessed portion 13 has a depth with which a protruding electrode of, for example, a semiconductor electronic component can be immersed, which may be about 10 to 20 for example.

Figure 3A:
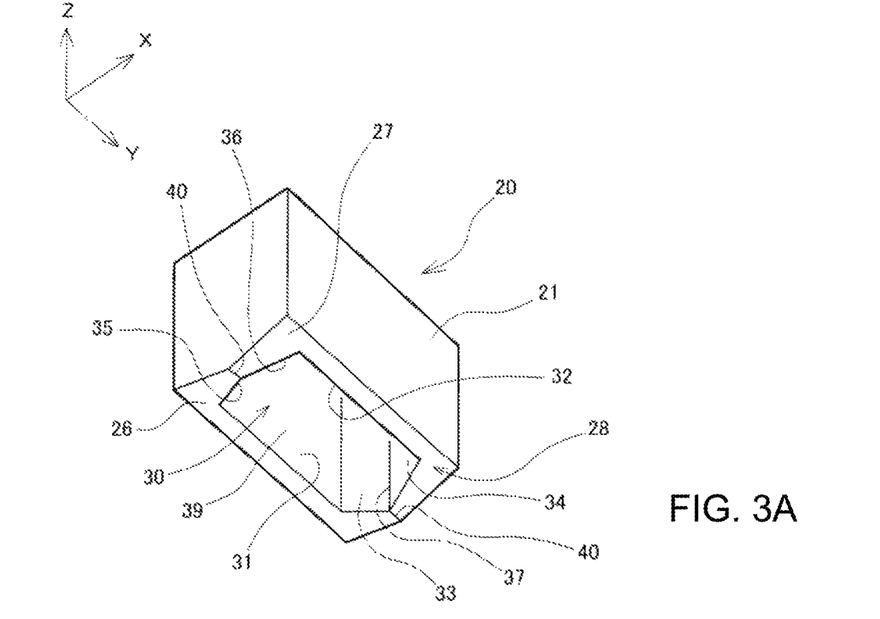
FIG. 3A is a perspective view of the flux reservoir apparatus according to the embodiment of the present invention and FIG. 3B is a flux pot viewed from the bottom surface thereof.
Figure 3B:
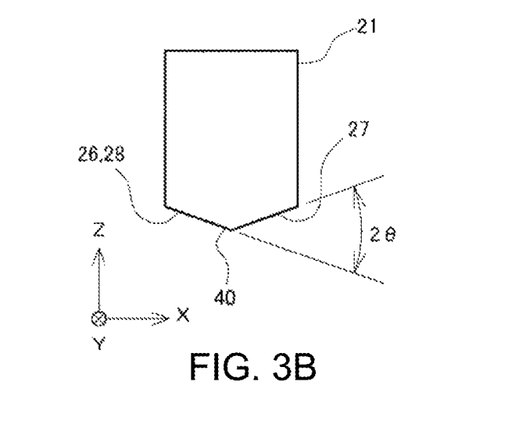

As shown in FIGS. 2(a) and 2(b), the flux pot main body 21 is composed of an annular member having a through hole 30 that penetrates in the Z direction through which flux flows, and is arranged to feed the flux in the through hole 30 through a stage-side opening 39 of the through hole 30 into the recessed portion 13 and to smooth the surface of the flux with its bottom surface 28. The through hole 30 is an elongated hexagonal hole elongated in the direction (Y direction) perpendicular to the direction of back-and-forth movement, and the length W2 in the longitudinal direction (Y direction) is greater than the Y-directional width W1 of the recessed portion 13 of the stage 12. Also, as shown in FIGS. 2(b), 3(a), and 3(b), the bottom surface 28 of the flux pot main body 21 is a chevron surface in which a first contact surface 26 and a second contact surface 27 in contact with the surface 14 of the stage 12 are connected at an angle 20 into a linear ridge 40.

As shown in more detail in FIGS. 2(a) and 2(b), the elongated hexagonal through hole 30 has a first inner surface 31 extending in the Y direction with a length approximately equal to the Y-directional width W1 of the recessed portion 13, a second inner surface 32 with a width W1 opposed to the first inner surface 31, a third inner surface 33 connected to the first inner surface 31 and inclined positively in the Y direction as shown in FIG. 2(a), a fourth inner surface 34 connected to the third inner surface 33 and the second inner surface 32 and inclined positively in the Y direction as shown in FIG. 2(a), and a fifth inner surface 35 and a sixth inner surface 36 opposed, respectively, to the third inner surface 33 and the fourth inner surface 34. The fifth inner surface 35 and the sixth inner surface 36 are inclined negatively in the Y direction as shown in FIG. 2(a). The Y-directional length W2 from a first connection line 37 between the third inner surface 33 and the fourth inner surface 34 to a second connection line 38 between the fifth inner surface 35 and the sixth inner surface 36 is then greater than the Y-directional width W1 of the recessed portion 13 of the stage 12. As shown in FIG. 2(a), the connection lines 37, 38 are external to the end faces of the recessed portion 13 by a width "d". Also, as shown in FIG. 3(a), the first, third, and fifth inner surfaces 31, 33, 35 of the through hole 30 are connected to the first contact surface 26 of the bottom surface 28 of the flux pot main body 21, while the second, fourth, and sixth inner surfaces 32, 34, 36 are connected to the second contact surface 27 of the bottom surface 28. It is noted that this embodiment is described on the assumption that the Y-directional length of the first inner surface 31 and the second inner surface 32 is approximately equal to the Y-directional width W1 of the recessed portion 13, but the length of the first and second inner surfaces 31, 32 may be slightly greater or smaller than the width W1 of the recessed portion 13 as long as the width W2 from the first connection line 37 to the second connection line 38 is greater than the width W1 of the recessed portion 13.

Figure 4A:
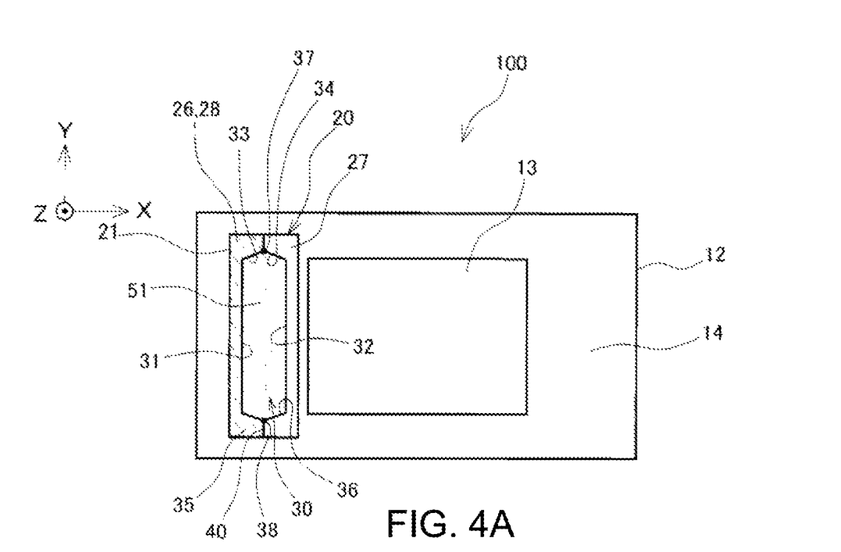
FIG. 4A shows a plan view and FIG. 4B shows an elevational view (side view) showing the forward movement of the flux pot of the flux reservoir apparatus according to the embodiment of the present invention.
Figure 4B:
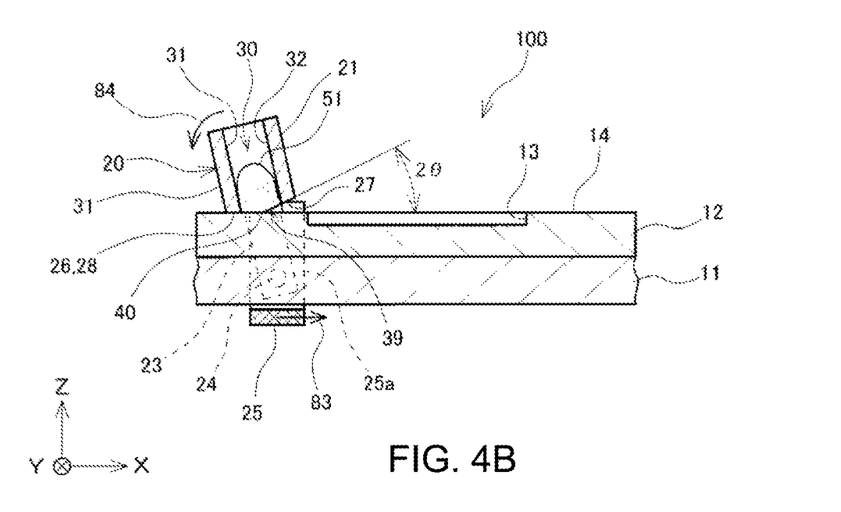

An operation of the thus arranged flux reservoir apparatus 100 will be described with reference to FIGS. 4 to 7. As shown in FIG. 4(b), when the slider 25 is moved positively in the X direction (indicated by the arrow 83) by the motor not shown, the pins 24 are also moved positively in the X direction. When the pins 24, which are positioned below the surface 14 of the stage 12, are thus moved positively in the X direction, the flux pot main body 21 is rotated counterclockwise around the ridge 40 of the bottom surface 28 as indicated by the arrow 84, so that the first contact surface 26 of the bottom surface 28 comes into contact with the surface 14 of the stage 12. In contrast, the second contact surface 27 moves away from the surface 14 of the stage 12 to result in an inclination of the angle 20 with respect to the surface 14. This brings the flux pot main body 21 into a state inclined negatively in the X direction by the angle 20 with respect to the surface 14 of the stage 12 (inclined backward in the travel direction). In FIG. 4(a), the first contact surface 26 in contact with the surface 14 of the stage 12 is diagonally hatched. The same applies to FIG. 5(a). Flux 51 is in the elongated hexagonal through hole 30 of the flux pot main body 21. The flux 51 has viscosity and is therefore raised in a central portion of the through hole 30 in the X direction and the Y direction. In FIGS. 4(a) and 4(b), the flux is dot-shaded.

Figures 5A, 5C:
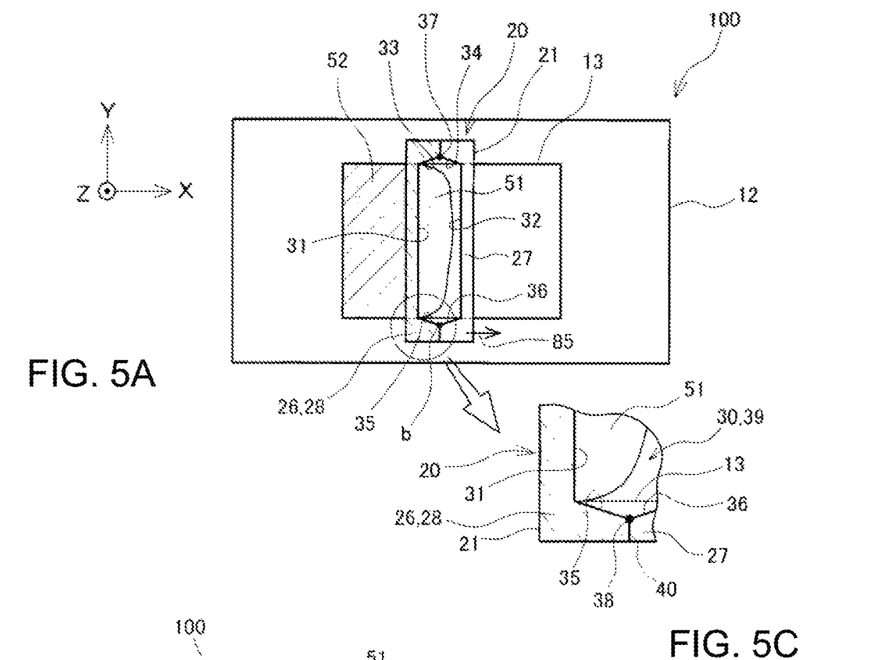
Figure 5B:
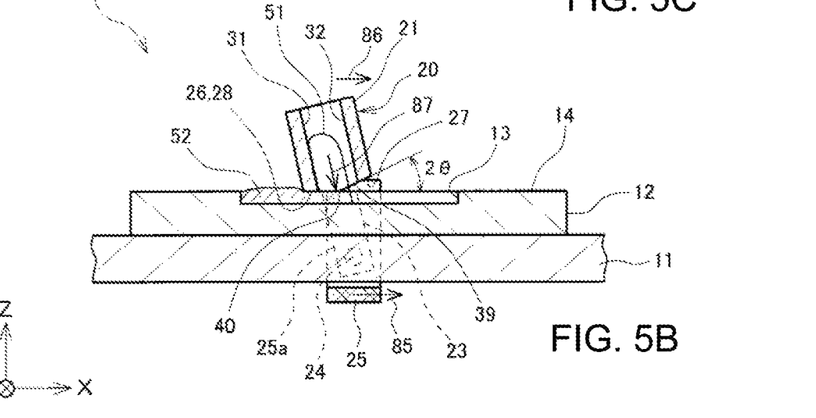

In this state, when the motor not shown is driven to further move (forward) the slider 25 in the direction of the arrow 83 (positively in the X direction), the flux pot main body 21 is applied with a force via the pins 24 and the brackets 23 in the direction of the arrow 83 (positively in the X direction), so that the first contact surface 26 comes into contact with the surface 14 of the stage 12 and moves in the direction of the arrows 85, 86 shown in FIG. 5(b) (positively in the X direction) in the state inclined backward in the travel direction of the slider 25.

When the through hole 30 of the flux pot main body 21 comes over the recessed portion 13 of the stage 12, the flux 51 in the through hole 30 of the flux pot main body 21 outflows through the stage-side opening 39 of the through hole 30 into the recessed portion 13, as indicated by the arrow 87 in FIG. 5(b), to be flux 52 filling the recessed portion 13. It is noted that in FIGS. 5(a) and 5(b), the flux 52 is dot-shaded as well as diagonally hatched. As shown in FIG. 5(a), during the movement of the flux pot main body 21 in the positive X direction, the flux 51 in the through hole 30 comes, due to its viscosity, close to the first inner surface 31 of the flux pot main body 21 that is positioned posteriorly in the travel direction (negatively in the X direction), while there is a clearance gap on the side of the second inner surface 32 that is positioned anteriorly in the travel direction (positively in the X direction). Also, as shown in FIG. 5(c), in the stage-side opening 39 of the through hole 30, the flux 51 is raised, due to its viscosity, forward in the travel direction (positively in the X direction) from the first inner surface 31 toward the second inner surface 32 to have a cross-sectional shape hog-backed in a manner separated from the fifth and sixth inner surfaces 35, 36. This causes a clearance gap between the fifth and sixth inner surfaces 35, 36 and the flux 51. In this embodiment, since the Y-directional width of the first and second inner surfaces 31, 32 is W1, which is approximately equal to the width of the recessed portion 13, the flux 51 does not overflow in the width direction (Y direction) of the recessed portion 13, as shown in FIG. 5(c). Also, as shown in FIG. 5(b), the surface of the flux 52 filling the recessed portion 13 is smoothed by the first contact surface 26 of the flux pot main body 21 with the movement of the flux pot main body 21 in the positive X direction but, after the flux pot main body 21 passes therethrough, raised slightly from the surface 14 of the stage 12 due to the surface tension caused by its viscosity.

Figure 6A:
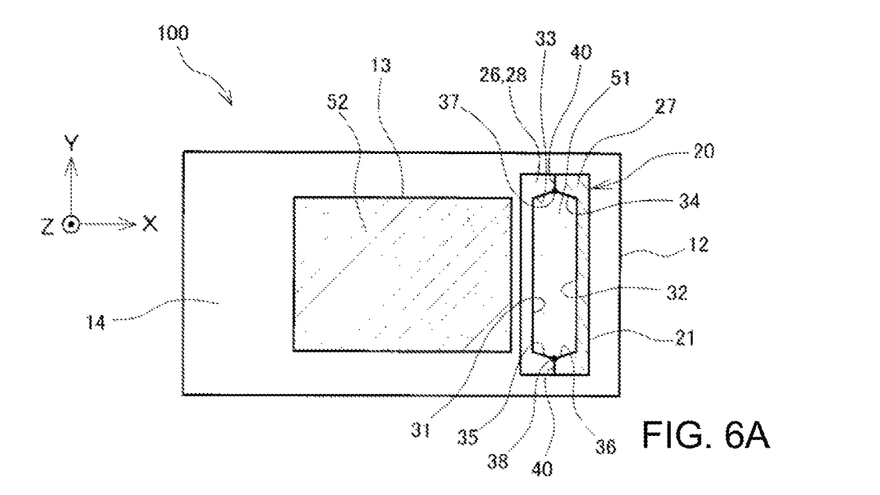
FIG. 6A shows a plan view and FIG. 6B shows an elevational view (side view) showing the backward movement of the flux pot of the flux reservoir apparatus according to the embodiment of the present invention.
Figure 6B:
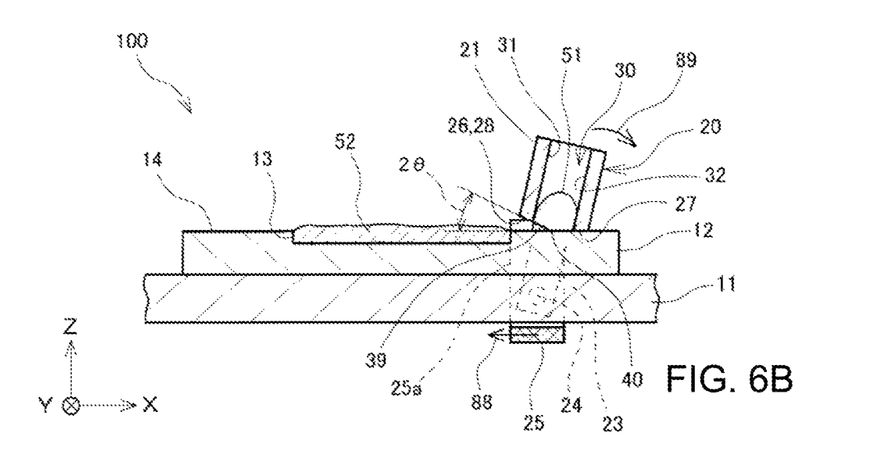

When the slider 25 is further moved (forward) positively in the X direction, the flux pot main body 21 moves across the recessed portion 13 of the stage 12 onto the opposite surface 14, as shown in FIGS. 6(a) and 6(b). When the flux pot main body 21 moves onto the opposite surface 14 of the stage 12, the recessed portion 13 is filled with the flux 52 and the surface of the flux 52 is raised slightly from the surface 14 of the stage 12 due to the surface tension caused by its viscosity.

Here, when the slider 25 is moved (backward) negatively in the X direction as indicated by the arrow 88 in FIG. 6(b), the pins 24 are also moved negatively in the X direction. When the pins 24, which are positioned below the surface 14 of the stage 12, are thus moved negatively in the X direction, the flux pot main body 21 is rotated clockwise around the ridge 40 of the bottom surface 28 as indicated by the arrow 89, so that the first contact surface 26 of the bottom surface 28, which has been in contact with the surface 14 of the stage 12 during the forward movement, is inclined at the angle 2θ with respect to and separated from the surface 14 of the stage 12, while the second contact surface 27, which has been separated from the surface of the stage 12, comes into contact with the surface 14 of the stage 12. In FIG. 6(a), the second contact surface 27 in contact with the surface 14 of the stage 12 is diagonally hatched. The same applies to FIG. 7(a). The flux 51 in the through hole 30, though having a smaller volume by the amount of outflow to fill the recessed portion 13, raised, due to its viscosity, in a central portion of the through hole 30 in the X direction and the Y direction similarly to the state before starting the (forward) movement in the positive X direction.

Figure 7A:
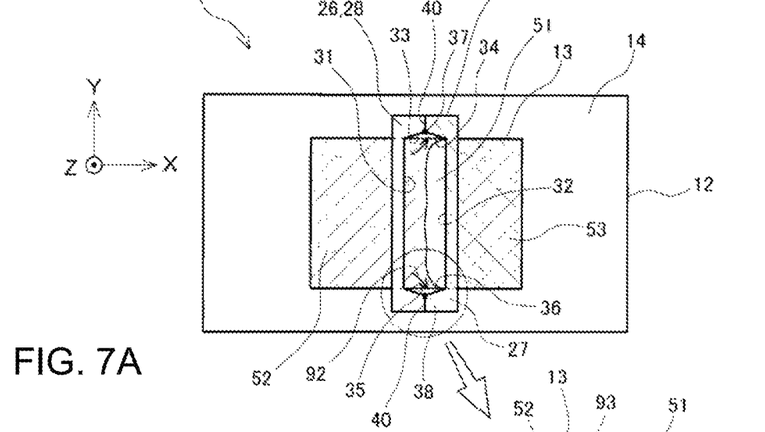
Figures 7B, 7C:
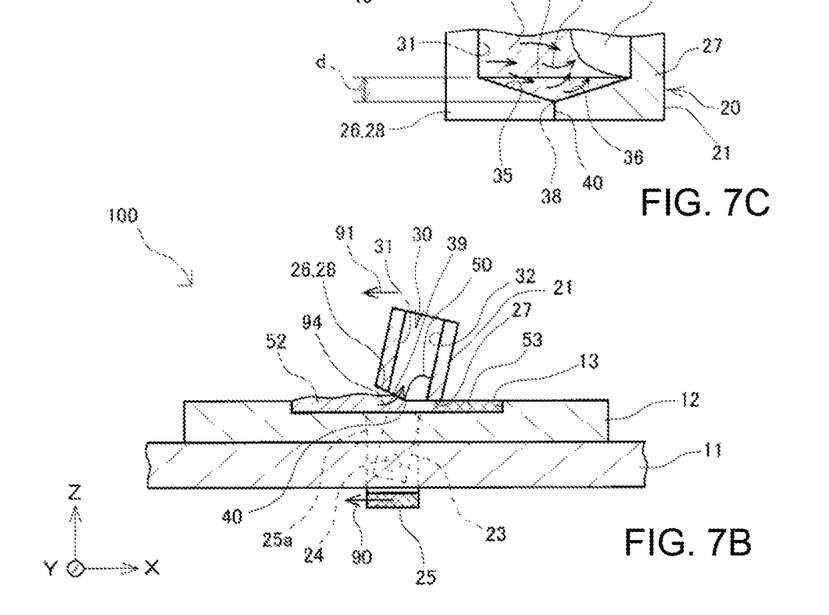
FIG. 7B shows and elevational view (side view) and FIG. 7C shows an exploded partial view showing the backward movement of the flux pot of the flux reservoir apparatus according to the embodiment of the present invention.

In this state, when the motor not shown is driven to further move (backward) the slider 25 in the direction of the arrow 90 shown in FIG. 7 (negatively in the X direction), the flux pot main body 21 is applied with a force via the pins 24 and the brackets 23 in the direction of the arrow 90 shown in FIG. 7(b) (negatively in the X direction), so that the second contact surface 27 comes into contact with the surface 14 of the stage 12 and moves in the direction of the arrows 91 (negatively in the X direction) in the state inclined backward in the travel direction of the slider 25.

As shown in FIG. 7(a), during the movement of the flux pot main body 21 in the negative X direction, the flux 51 in the through hole 30 comes, due to its viscosity, close to the second inner surface 32 that is positioned posteriorly in the travel direction (positively in the X direction), while there is a clearance gap on the side of the first inner surface 31 that is positioned anteriorly in the travel direction (negatively in the X direction), as in the case of the movement of the flux pot main body 21 in the positive X direction described with reference to FIGS. 5(a) and 5(b). Also, as shown in FIG. 7(c), in the stage-side opening 39 of the through hole 30, the flux 51 is raised, due to its viscosity, forward in the travel direction (negatively in the X direction) from the second inner surface 32 toward the first inner surface 31 to have a cross-sectional shape hog-backed in a manner separated from the fifth and sixth inner surfaces 35, 36, as in the case described with reference to FIG. 5(c). This causes a clearance gap between the fifth and sixth inner surfaces 35, 36 and the flux 51.

As shown in FIG. 7(b), when the flux pot main body 21 moves negatively in the X direction, the first contact surface 26 that is positioned anteriorly in the travel direction is inclined upward at the angle 2θ with respect to the surface of the stage 12, whereby there is a clearance gap between the surface of the flux 52, which is raise above the surface 14 of the stage 12 due to the surface tension caused by its viscosity, and the first contact surface 26. Accordingly, the portion of the flux 52 raised above the surface 14 of the stage 12 flows through the clearance gap in the stage-side opening 39 of the through hole 30 into the through hole 30, as indicated by the arrow 94 in FIG. 7(b). As shown in FIGS. 7(a) and 7(c), the flux 52 flows into the clearance gap between the flux 51 in the through hole 30 and the first, third, fourth, fifth, and sixth inner surfaces 31, 33, 34, 35, 36. A portion of the flux 52 flowing into the clearance gap spreads wider than the width W1 of the recessed portion 13 along the surface 14 of the stage 12, as indicated by the arrow 92 in FIG. 7(a).

As shown in FIGS. 7(a) to 7(c), since the second contact surface 27 is in contact with the surface 14 of the stage 12, the Y-directional width between the first connection line 37 and the second connection line 38 is W2, which is wider than the Y-directional width W1 of the recessed portion 13 and the connection lines 37, 38 are external to the end faces of the recessed portion 13 by the width "d" in the Y direction, and the Y-directional width of the second inner surface 32 is W1, which is approximately equal to the Y-directional width W1 of the recessed portion 13, the fourth inner surface 34 and the sixth inner surface 36 are in contact with the surface 14 of the stage 12 to form surfaces extending vertically (in the Z direction). Accordingly, the flux 52 spreading wider than the width W1 of the recessed portion 13 along the surface 14 of the stage 12 and thereby flowing into the through hole 30 with the (backward) movement of the flux pot main body 21 in the negative X direction is held back by the fourth and sixth inner surfaces 34, 36 so as not to leak out of the through hole 30. As shown in FIG. 7(c), since the fourth and sixth inner surfaces 34, 36 have a narrower opposition width backward in the travel direction, the flux 52 held back by the sixth inner surface 36 flows toward the center of the through hole 30 of the flux pot main body 21 along the sixth inner surface 36 to be recovered into the through hole 30, as indicated by the arrow 93 in FIG. 7(c). Similarly, the flux 52 held back by the fourth inner surface 34 also flows toward the center of the through hole 30 of the flux pot main body 21 along the fourth inner surface 34 to be recovered into the through hole 30.

Also, the surface of the flux 52 after the portion of the flux 52 raised above the surface 14 of the stage 12 is recovered into the flux pot main body 21 is smoothed by the second contact surface 27 of the flux pot main body 21 to be flux 53 with the surface approximately flat. It is noted that in FIGS. 7(a) to 7(c), the flux 53 is dot-shaded and cross-hatched to be shown distinctively from the dot-shaded and diagonally hatched flux 52.

As described heretofore, when the flux pot main body 21 moves (backward) in the negative X direction, the portion of the flux 52 raised above the surface 14 of the stage 12 is recovered into the through hole 30 of the flux pot main body 21, whereby it is possible to reduce the leakage of the flux 52 out of the flux pot main body 21.

While in the description above, the flux 52 is recovered into the through hole 30 when the flux pot main body 21 moves (backward) in the negative X direction, it is possible to recover the flux 52 into the through hole 30 of the flux pot main body 21 also when the flux pot main body 21 moves (forward) in the positive X direction, as described with reference to FIGS. 6 and 7. In this case, since the first contact surface 26 is in contact with the surface 14 of the stage 12, the flux 52 spreading wider than the width W1 of the recessed portion 13 along the surface 14 of the stage 12 and thereby flowing into the through hole 30 is held back by the third and fifth inner surfaces 33, 35 so as not to leak out of the through hole 30. The flux 52 held back by the third and fifth inner surfaces 33, 35 also flows toward the center of the through hole 30 of the flux pot main body 21 along the third and fifth inner surfaces 33, 35 to be recovered into the through hole 30. The flux reservoir apparatus 100 of this embodiment can thus recover the flux 52 into the through hole 30 to reduce the leakage out of the flux pot main body 21 when the flux pot main body 21 moves forward as well as backward.

In contrast, in the related art flux reservoir apparatus 200 shown in FIG. 9, since the bottom surface 73 of the flux pot 70 is not a chevron surface but a flat surface, when the flux pot 70 is moved back-and-forth as indicated by the arrow 95 in FIG. 9(b), the portion of the flux 52 raised above the surface 14 of the stage 12 comes into contact with the surface 72 of the flux pot 70 that is positioned anteriorly in the travel direction and adheres to the lower part of the surface 72, as indicated by the arrow 96 in FIG. 9(b). The flux 52 adhering to the lower part of the surface 72 then adheres to the surface 14 of the stage 12 when the flux pot 70 moves onto the surface 14 of the stage 12. With the back-and-forth movement of the flux pot 70, the flux 52 thus leaks out without being recovered into the flux pot 70.

Even if the related art flux pot 70 may be installed with the bottom surface 73 being inclined with respect to the surface 14 of the stage 12, the flux 52 would leak out through the clearance gap between the bottom surface 73 of the flux pot 70 and the surface 14 of the stage 12 because the bottom surface 73 and the surface 14 cannot come into surface contact with each other and there is no surface to hold back the flux 52.

In contrast, the flux reservoir apparatus 100 of this embodiment has the above-described arrangement, in which the through hole 30 of the flux pot main body 21 is an elongated hexagonal hole elongated in the Y direction and the Y-directional length W2 is greater than the Y-directional width W1 of the recessed portion 13 of the stage 12, the bottom surface 28 is a chevron surface in which the first and second contact surfaces 26, 27 are connected at an angle 2θ into a linear ridge, and the flux pot main body 21, the ribs 22, and the brackets 23 forming the flux pot 20 and the pins 24, the slider 25, and the motor forming the back-and-forth drive mechanism are arranged such that the flux pot main body 21 is supported rotatably below the surface 14 of the stage 12 and the flux pot main body 21 is applied with a force in the back-and-forth direction below the surface 14 of the stage 12, whereby during back-and-forth movement, one of the first and second contact surfaces 26, 27 that is positioned posteriorly in the travel direction comes into contact with the surface 14 of the stage 12, while the other that is positioned anteriorly in the travel direction is inclined with respect to the surface 14 of the stage 12 to form a clearance gap with the surface 14, which allows the flux 52 spreading wider than the width W1 of the recessed portion 13 along the surface 14 of the stage 12 and thereby flowing into the through hole 30 to be held back by the inner surfaces 33 to 36 of the through hole 30 to effectively reduce the leakage of the flux 52 out of the through hole 30. Further, in this embodiment, the flux 52 can be recovered effectively.

Figure 8:
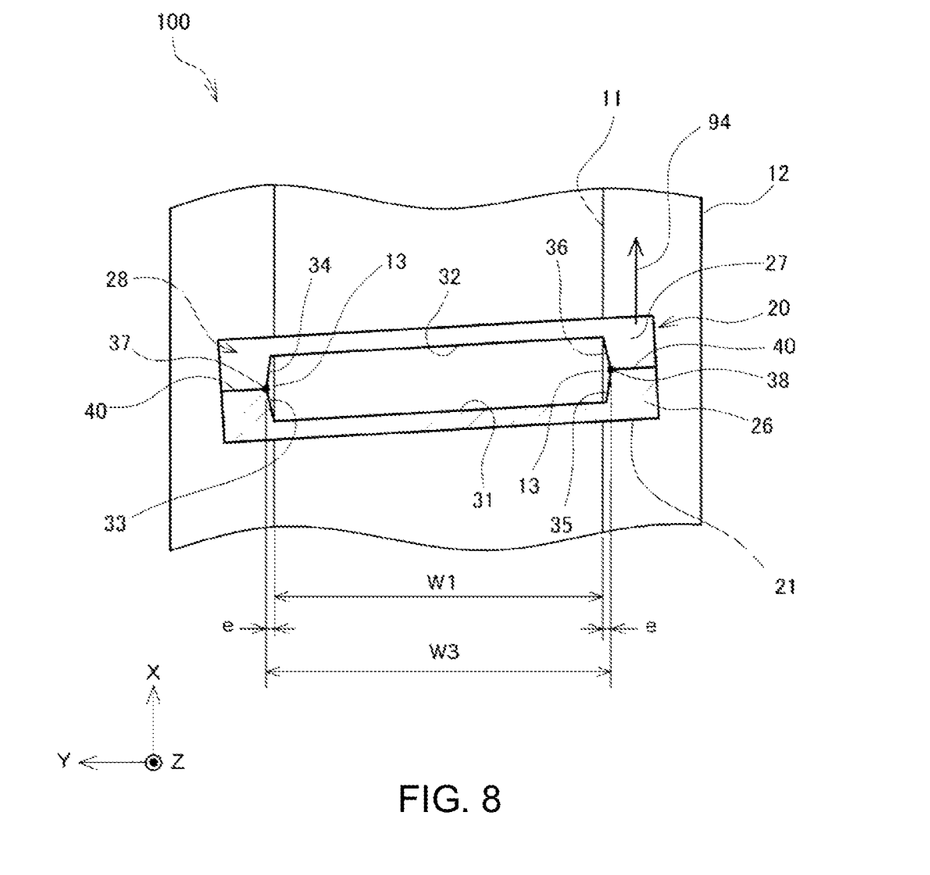
FIG. 8 is an illustrative view showing the back-and-forth movement of the flux pot of the flux reservoir apparatus according to the embodiment of the present invention in the case of misalignment.

Moreover, in the flux reservoir apparatus 100 of this embodiment, since the through hole 30 of the flux pot main body 21 is an elongated hexagonal hole elongated in the Y direction and the Y-directional length W2 is greater than the Y-directional width W1 of the recessed portion 13 of the stage 12, if the flux pot main body 21 may be slightly misaligned in the X and Y directions and thereby move back-and-forth in the X direction with its longitudinal direction being slightly inclined with respect to the Y direction as shown in FIG. 8, the Y-directional length is W3, which is smaller than W2 in the absence of misalignment according to the inclination angle, but greater than the Y-directional width W1 of the recessed portion 13 of the stage 12, and therefore the connection lines 37, 38 are external to the end faces of the recessed portion 13 by a width "e". This allows the flux 52 spreading wider than the width W1 of the recessed portion 13 along the surface 14 of the stage 12 and thereby flowing into the through hole 30 to be held back by the inner surfaces 33 to 36 of the through hole 30 to effectively reduce the leakage of the flux 52 out of the through hole 30, as described above with reference to FIGS. 4 to 7.

The present invention is not limited to the above-described embodiments, but encompasses all changes and modifications without departing from the technical scope and spirit of the invention defined in the appended claims.

REFERENCE SIGNS LIST

11 Base
12 Stage
13 Recessed portion
14, 72 Surfaces
15 Bolt
20, 70 Flux pots
21 Flux pot main body
22 Rib
23 Bracket
24 Pin 25 Slider
25a Arm
26 First contact surface
27 Second contact surface
28, 73 Bottom surfaces
30, 71 Through holes
31-36 Inner surfaces
37, 38 Connection lines
39 Stage-side opening
40 Ridge
51-53 Flux
81-96 Arrows
100, 200 Flux reservoir apparatuses

The invention claimed is:
1. A flux reservoir apparatus comprising:
a stage having a recessed portion for reserving flux therein;
a flux pot composed of an annular member having a through hole through which the flux flows, the flux pot arranged to move back-and-forth on a surface of the stage to feed the flux in the through hole into the recessed portion and to smooth a surface of the flux with a bottom surface of the flux pot; and
a rotation mechanism configured to rotate the flux pot and tilt the flux pot in a direction opposite to a moving direction when the flux pot is moving back-and-forth;
wherein the through hole of the flux pot is an elongated hexagonal hole elongated in a direction perpendicular to a back-and-forth direction with a length greater than the width of the recessed portion of the stage in the direction perpendicular to the back-and-forth direction, and wherein
wherein the bottom surface of the flux pot is an end face of the through hole and a chevron surface in which two surfaces are connected at an angle to define a linear ridge.
2. The flux reservoir apparatus according to claim 1, further comprising
a back-and-forth drive mechanism disposed below the surface of the stage and arranged to rotatably support the flux pot and to apply a force below the surface of the stage in the back-and-forth direction to the flux pot.

* * * * *